A. BREAR.
Evaporating Pan.
No. 34,811. Patented Apr. 1, 1862.
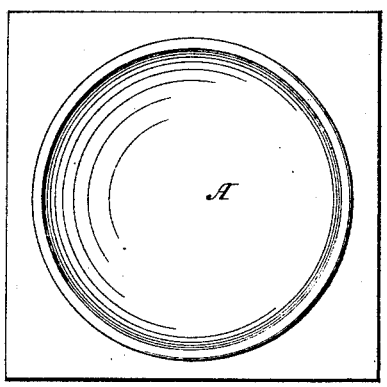
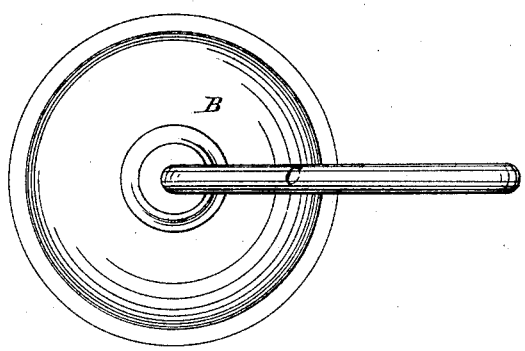
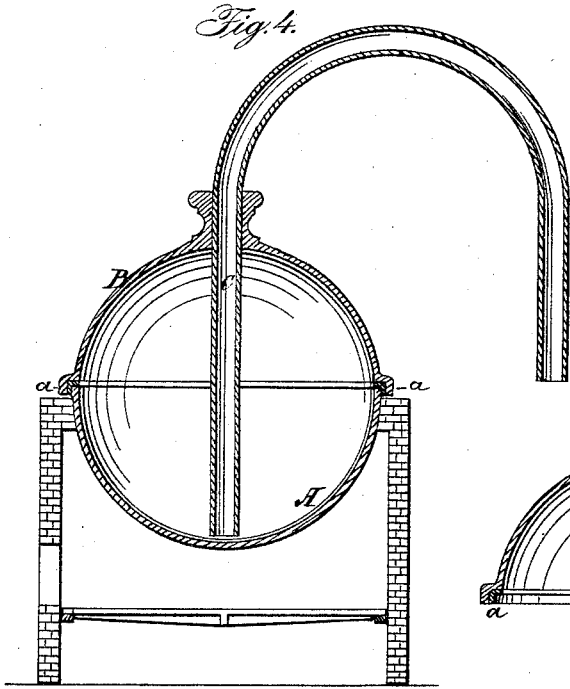
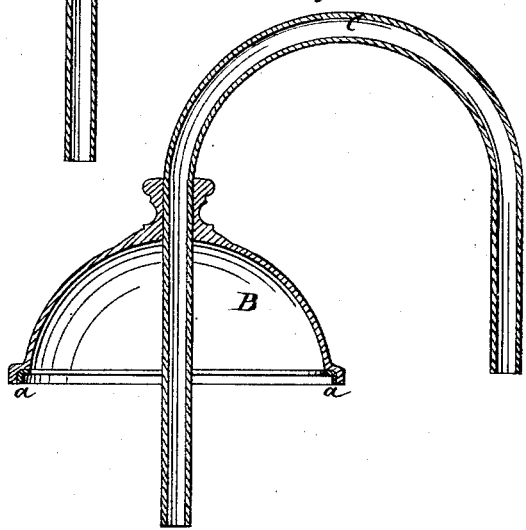
Witnesses:
Henry T. Brown
A. F. Schlegel
Inventor:
Abel Brear

United States Patent Office.

ABEL BREAR, OF SAUGATUCK, CONNECTICUT.

IMPROVED MODE OF DISCHARGING THE CONTENTS OF SUGAR-KETTLES AND OTHER VESSELS.

Specification forming part of Letters Patent No. 34,811, dated April 1, 1862.

*To all whom it may concern:*

Be it known that I, ABEL BREAR, of Saugatuck, in the county of Fairfield and State of Connecticut, have invented a new and improved means of discharging kettles used in the evaporation of cane-juices and other juices and solutions, and vessels used in other boiling operations; and I do hereby declare that the following is a full, clear, and exact description of the same, reference being had to the accompanying drawings, forming part of this specification, in which—

Figure 1 is a plan of an ordinary sugar-kettle. Fig. 2 is a plan of the movable cover and discharge-pipe, and Fig. 3 is a central vertical section of the same. Fig. 4 is a central vertical section of the kettle with the cover applied for discharging.

Similar letters of reference indicate corresponding parts in the several figures.

The principal object of this invention is to transfer the juice from one kettle to another of the train, or otherwise to empty the kettles in the manufacture of sugar without manual labor. This operation is commonly done by ladling, which is a very laborious as well as a tedious process.

The invention consists in the employment for the purpose above mentioned of a movable cover fitting to the rim of the kettle with a suitable packing in such manner as to be capable of making a steam-tight joint therewith, and furnished with a pipe, of goose-neck or other suitable form, having a suitable length below the cover to reach nearly to the bottom of the kettle. When the kettle is to be discharged, the cover is placed upon it, and the steam generated from the juice, pressing on the surface thereof, discharges it through the pipe, which is placed in such direction as to deliver the juice into the next kettle of the train, or into any suitable receptacle. The same device is applicable to the discharge of the contents of vessels used in other boiling operations.

To enable others skilled in the art to make and use my invention, I will proceed to describe its construction and operation.

A is the kettle, set in the usual or in any suitable manner.

B is the movable cover, made with its rim of suitable form to receive on its under or inner surface a gasket or packing, *a*, of vulcanized india-rubber, felt, or other suitable material, and to fit the rim of the kettle; and C is the discharge-pipe, passing through and secured to the cover B. The portion of the said pipe outside of the said cover is of suitable goose-neck form to deliver the contents of a kettle into the next one, or into any receptacle into which it is desired to deliver them, and the portion inside of or below the said cover must be long enough to reach very nearly the bottom of the kettle to be discharged. The gasket or packing *a* should be permanently attached to the cover. This may be done by sewing it through holes provided for the purpose in the rim. The one cover may be used for all the kettles of a train, or for all the kettles or vessels in one establishment, provided the said kettles or vessels are all of one size. It may be made heavy enough to prevent its being lifted by the pressure of steam necessary to effect the discharge of the contents of the vessel, or be loaded with weights sufficient for the purpose, or be secured by temporarily-applied fastenings capable of easy and expeditious attachment and liberation.

To discharge a kettle or other vessel, the cover is put on, as shown in Fig. 4, while the liquid contents of the vessel are in a boiling state, and sufficient steam is quickly generated to discharge the liquid through the pipe C by means of the pressure on the surface, a very low pressure only being requisite for the purpose.

I do not claim, broadly, discharging a vessel of its liquid contents through the cover or top thereof by the pressure of steam on the surface of the liquid; but

What I claim as my invention, and desire to secure by Letters Patent, is—

The employment, for the discharge of open kettles or vessels used in boiling or evaporating processes, of a movable cover, B, and pipe C, the cover being so fitted to the rim of the kettle or vessel that by placing it thereon temporarily the contents of the vessel may be expelled through the pipe by steam generated within the kettle or vessel itself, substantially as herein specified.

ABEL BREAR.

Witnesses:
HENRY T. BROWN,
A. F. SCHLEGEL.